United States Patent [19]
Brooks

[11] 3,933,964
[45] Jan. 20, 1976

[54] RESIN LAMINATE AND METHOD OF MAKING
[76] Inventor: Bernard W. Brooks, R.D. No. 3, Great Barrington, Mass. 02138
[22] Filed: Apr. 26, 1971
[21] Appl. No.: 137,342

[52] U.S. Cl. .............. 264/171; 156/244; 264/175; 264/237
[51] Int. Cl.² .................. B32B 27/30; B32B 27/08
[58] Field of Search ....... 264/171, 75, 237; 156/244

[56] References Cited
UNITED STATES PATENTS

| | | | |
|---|---|---|---|
| 3,170,013 | 2/1965 | Ploetz | 264/171 |
| 3,276,943 | 10/1966 | Kawamura | 264/171 |
| 3,420,679 | 1/1969 | Gifford et al. | 156/244 |
| 3,443,277 | 5/1969 | Frielingsdorf | 264/171 |
| 3,476,627 | 11/1969 | Squires | 156/244 |
| 3,556,635 | 1/1971 | Schrenk et al. | 264/171 |
| 3,565,985 | 2/1971 | Schrenk et al. | 264/171 |
| 3,639,573 | 2/1972 | Port | 264/75 |
| 3,668,288 | 6/1972 | Takahashi | 264/89 |

Primary Examiner—Jeffery R. Thurlow
Attorney, Agent, or Firm—Parmelee, Miller, Welsh & Kratz

[57] ABSTRACT

A resin product is produced as an extrudate made up of two or more layers of different resin materials that retain desirable characteristics of each type of material. The layers are molecularly bonded or fully adhered in a face-to-face relation without an adverse modification of the characteristics of the individual materials. The extrudate is produced in the form of a longitudinal strip or sheet by simultaneously separately forcing or co-extending two or more different resin materials in a liquid or molten condition through separate die passageways while forming or shaping each material into a desired shape and applying the shaped materials as laminates in a face-to-face relation upon each other, while advancing them and thereafter solidifying them as adhering layers or plys of a unitized strip or sheet length.

5 Claims, 7 Drawing Figures

--}}

U.S. Patent   Jan. 20, 1976   3,933,964
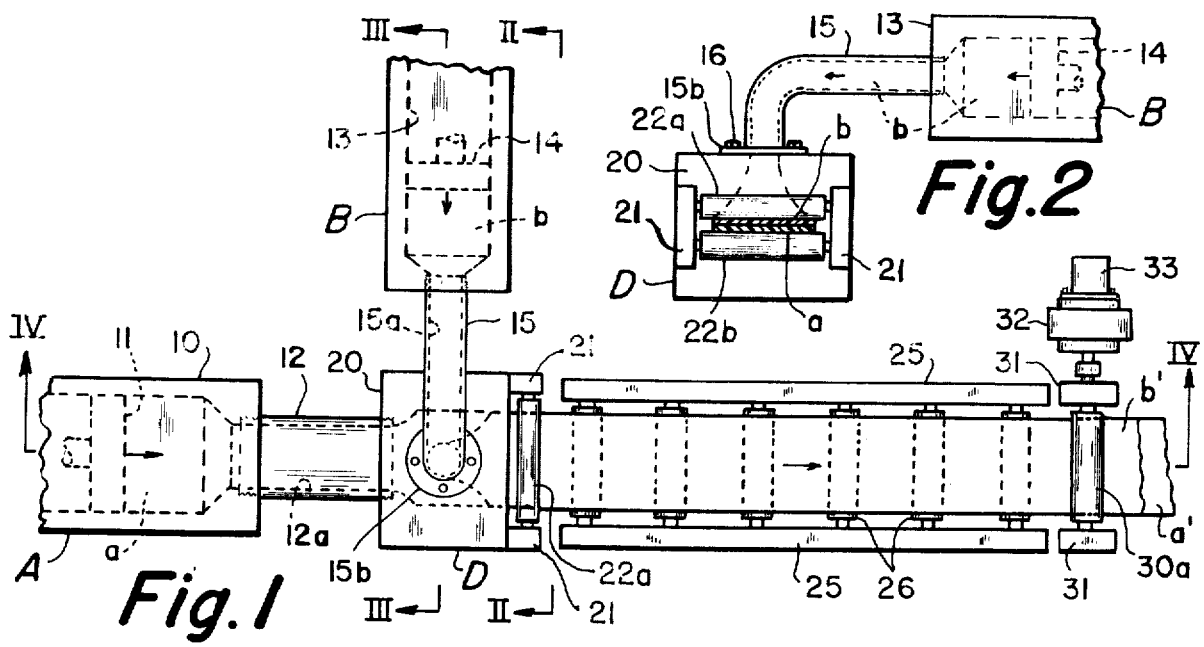
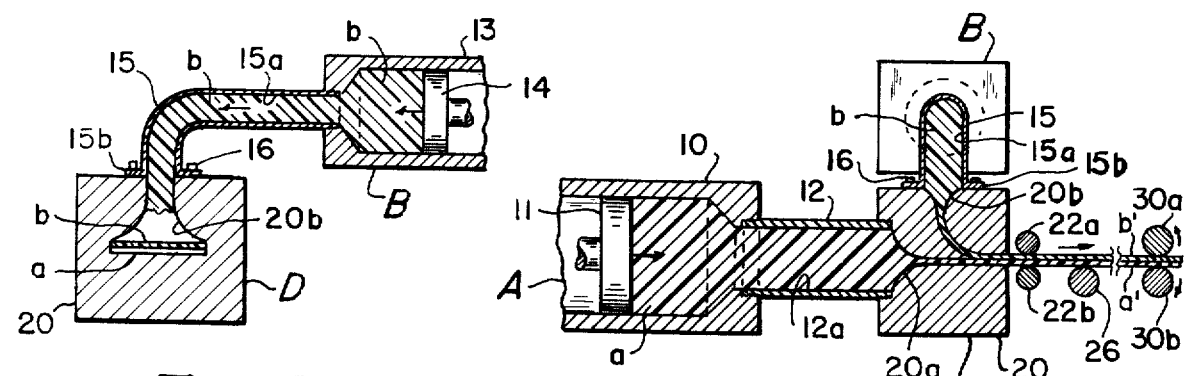
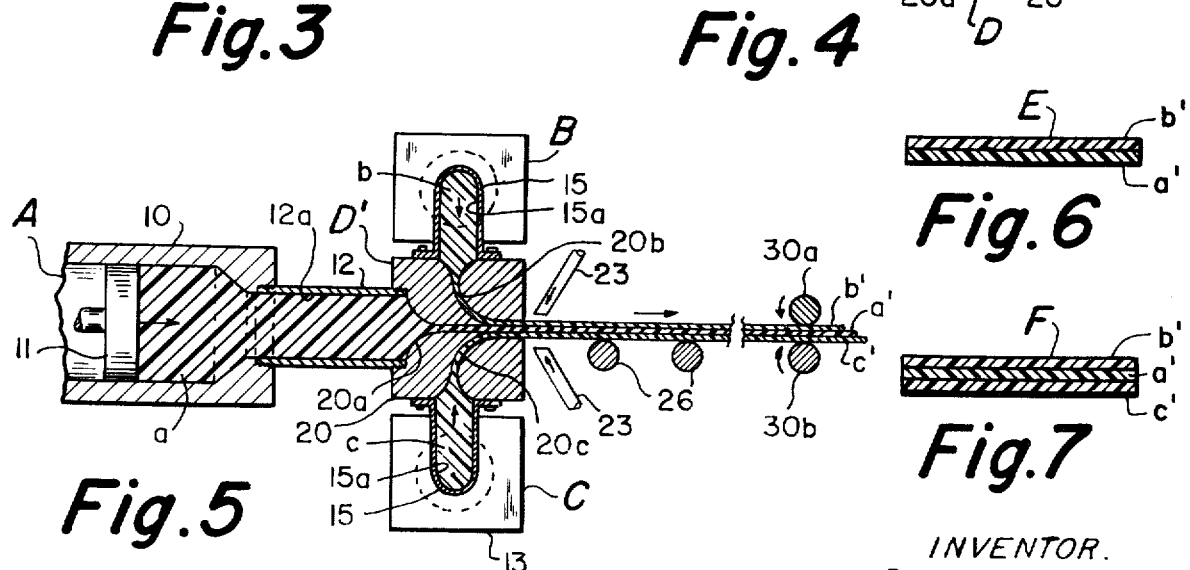
INVENTOR.
Bernard W. Brooks
BY Green, McCallister & Miller
HIS ATTORNEYS

3,933,964

RESIN LAMINATE AND METHOD OF MAKING

BACKGROUND OF THE INVENTION

1. Field of the Invention

This invention relates to an improved resin product of laminate construction and to procedure for attaining it. It relates particularly to a composite extrudate resin product having an improved combination of properties and to procedure for forming it.

2. Description of the Prior Art

In the application for use of resins or so-called plastic materials, it is advantageous to provide panel or glazing members with a portion having one set of characteristics and another portion having other characteristics, all without adversely modifying or effecting the characteristics or features of each. It is impossible to, for example, successfully laminate solidified acrylic sheet material to a solidified polycarbonate sheet material. In other words, difficulty is encountered in attempting to combine two resin materials having different rates of thermo expansion, since delamination will result. Also, it has been found impractical to combine two or more materials in the hopper before extruding them, since they contaminate one another and result in an extrudate having entirely different characteristics that are undesirable as compared to those of the separate resins.

SUMMARY OF THE INVENTION

In the field of glazing applications or particularly in the field of producing a resin material product that has the most desirable characteristics for light transmission and without adverse reaction, for example, under ultraviolet light, I have found that two plastic materials are particularly suitable if their individual desirable characteristics or properties can be effectively utilized in combination. One of these is an acrylic which has the characteristic of being visually clear, resistant to attack from ultraviolet light, and of greater toughness than glass. It has, however, been found to be fairly fragile. To offset this weakness, a resin material such as polycarbonate that is almost unbreakable makes a good plying material, however, it is somewhat softer than acrylic, can be scratched easily and is less stable against ultraviolet light. Thus, a much better glazing material could be obtained if an acrylic can be combined with a polycarbonate so as to make use of the advantageous characteristics of both. However, only a milky white amalgam is produced if the two materials are combined in the hopper, melted and moved from an extruder through a die.

The problem has been met by a so-called co-extrusion technique that enables a flowing stream of acrylic to be simultaneously produced with a flowing stream of polycarbonate, and while both resins are in a molten condition, forming them into relatively planar or strip-like lengths and applying them in a face-to-face relation with respect to each other. The forming and plying of the molten strip-like or planar lengths is accomplished while enclosing them within the bore of a die and actively and simultaneously moving them as extrusions therefrom. Thereafter, the plied product is cooled to produce a unitary extrudate which can be shaped, formed and used without danger of separating the layers or plys with respect to each other. The composite product as formed can be utilized in such a manner as to take advantage of the good properties of the different resin material content thereof. For example, it has been determined that where colors are desired that an acrylic has much better white translucent color than a polycarbonate, and it is possible to extrudate a sheet using a white translucent color of acrylic resin as an outer layer that has a better whitish color than can be obtained by coloring a carbonate resin alone.

It has thus been an object of the invention to devise a solution to the problem of providing resin material suitable for glazing and other applications that embodies advantageous characteristics of different resins in a unitary structure or body.

Another object of the invention has been to devise a laminated extrudate in the nature of a strip-like product that contains resin materials of different characteristics.

A further object has been to develop a procedure for producing a resin laminate product whose layers, although constituting different resins having different characteristics such as different coefficients of expansion, will have a substantially molecular type of surface or face-to-face bond with respect to each other.

A still further object of the invention has been to produce a resin strip-like product of at least two different resin materials by simultaneously extruding the materials and employing them in an initial, heat-retaining, heat-softened condition, applying them upon each other as forwardly moving layers, and effectively adhering them while solidifying them as a unitary composite extruded product.

BRIEF DESCRIPTION OF THE DRAWINGS

In the drawings, FIG. 1 is a somewhat fragmental top plan view illustrating processing apparatus and a system embodying the invention and suitable for producing an improved resin product in accordance therewith.

FIG. 2 is a somewhat fragmental front end view in elevation on the scale of and taken along the line II—II of FIG. 1.

FIG. 3 is an end section in elevation on the scale of and taken along the line III—III of FIG. 1.

FIG. 4 is a side sectional view in elevation on the scale of and taken along the line IV—IV of FIG. 1.

FIG. 5 is a side sectional view in elevation on the scale of FIG. 4 and taken in the same direction as line IV—IV of FIG. 1, but illustrating a modified apparatus arrangement that may be used for producing a three-ply resin product as distinguished from the two-ply product of FIG. 4; in this view, air jet cooling means has been shown as alternate to the roll pass means of FIGS. 1 and 4.

And, FIGS. 6 and 7 are enlarged end sections through two forms of laminates or products produced in accordance with the invention. In this connection, FIG. 6 shows a two-ply or layer product such as produced in accordance with FIG. 4, while FIG. 7 shows a three-ply product such as produced in accordance with FIG. 5 of the drawings.

In accordance with the invention, at least two unlike resin materials as in pellet form are melted-down into a molten or substantially liquid condition and moved as pressure-energized continuous streams from extruders in an enclosed relation into passageways of a common forming die. Passageways in the die are adapted to individually receive each stream of resin material and, while the heat of the initial formation is being retained, shape or form each stream into a strip-like advancing stream. The streams are applied to each other in a face-to-face abutting relationship adjacent an exit port or passageway from which they issue as a molten, composite, strip-like continuous length. The existing plied stream, is substantially immediately adjacent the exit point from the die, subjected to a cooling and solidifying action. The plies, on solidifying, have a substantially molecularly bonded, cohesive, adhering relation with respect to each other along their opposed abutting faces. The bonded relation is such that each layer has the characteristics of its resin material and, irrespective of this fact and particularly of different coefficients of expansion of the materials, the bonded relation will be retained when the formed strip or continuous length is to be utilized as a glazing medium, such as in a light reflecting unit in a door, a window, etc.

Referring particularly to the drawings, a pair of extruders A and B are shown provided with fluid-actuated piston rods 11 and 14 that respectively operate within pressure cylinders 10 and 13. Hot, extruded resin material, such as $a$ and $b$ of FIG. 1, is forced outwardly under positive pressure from each extruder A and B, through a closed-off passageway 12a or 15a in a connecting collar or conduit 12 or 15 into a die D. As shown in FIGS. 3 and 4, one resin material, such as $a$ that is to become a base metal layer or ply, may be moved into one die opening or passageway 20a and the other layer or ply, such as $b$ that is to be an outer layer, is introduced into the die through another opening or passageway 20b. Each resin material $a$ and $b$ is then formed or shaped into a substantially flat or strip-like cross-sectional shape and advanced within the die D into a planar, wide face-to-face abutting relationship while still retaining the heat of its melting or preliminary forming operation. In the case of a polycarbonate resin, the forming temperature may be in the neighborhood of about 450° to 500° F and in the case of an acrylic resin may be in the neighborhood of about 400° F.

Thereafter, as shown in FIG. 4, the plied strip or continuous length is moved out of the die D and into the pass of a pair of smoothing and cooling rolls 22a and 22b. These rolls may have a stainless steel surface coating to simultaneously smooth and cool-solidify the layers into a composite strip. The now adherent layered composite strip comprising solidified layers $a'$ and $b'$ may then be moved along a conveyor table 25 having spaced idler, supporting rollers 26 therealong, into and through the pass of a motor-driven pinch roll station represented by rolls 30a and 30b (see particularly FIGS. 1 and 4). FIG. 2 shows the molten plied strip as it issues from the die D and passes through the assembly of rolls 22a and 22b. From this figure it will also be noted that the rolls 22a and 22b are journaled within a pair of side-positioned stands 21. The rolls may be idler or driven rolls, since movement of the composite strip is assured by the end-positioned positively driven pinch roll assembly 30a and 30b.

In the embodiment of FIG. 5, an additional extruder C is shown for providing a third stream of resin material $c$ to be applied to the other or opposite outer face of the strip. In this connection, the extruder C is of the same construction as extruders A and B to advance the molten or liquid resin material $c$ through the passageway 15a of a connecting conduit or collar 15 into another passageway 20c within die D'. In the die D', the resin materials $b$ and $c$ are applied as substantially flat or strip-like streams to the strip-like or flat stream of the base layer material $a$ to form a composite which, when solidified, is represented by cohesively bonded together layers $a'$, $b'$ and $c'$. To illustrate a further method of cooling, opposed air jets 23 are shown positioned adjacent the open exit mouth portion of the die D' to take the place of the roll assembly 22a, 22b. However, the use of the roll assembly is preferred, since it simultaneously accomplishes a smoothing compressing action on the layers as they emerge from the die.

In FIG. 6, a section through a formed two-ply strip or piece E is illustrated while in FIG. 7 a three-ply product F is illustrated. Ordinarily, in making a glazing product, the resin materials $b'$ and $c'$ may be of the same type, such as an acrylic resin, although different types may be used. This invention makes possible a cohesive type of bonding between resin material layers and a composite product such that irrespective of different properties of each layer and the fact that such properties are retained, there is no danger of a separation of the bonded relation between such layers under aging, forming or other stresses and strains.

With reference to the thickness of respective layers, the base or polycarbonate layer $a$ or $a'$ may have a thickness of about 0.240 inch and outer plies or layers $b$, $b'$ and $c'$ may each have a thickness of about 0.005 inch in the composite member. The polycarbonate layer, both by reason of its greater thickness and the physical characteristics of its resin material content, is employed as the primary or base layer of the composite member.

I claim:

1. A process of the character shown and described for forming an improved extrudate resin laminate for glazing utilizations that is relatively unbreakable, that has the property of toughness and visual clearness and of light transmission without adverse reaction to ultraviolet light, and that is capable of being shaped, formed and used without danger of separating its layers with respect to each other which comprises, pressure-energizing and advancing a continuous flowing stream of acrylic resin in a molten condition as a strip-like section within and along an extrusion flow path within a die, simultaneously pressure-energizing and advancing a continuous flowing stream of a polycarbonate resin in a fully molten condition as a strip-like section of greater thickness than the acrylic strip-like section within and along a second extrusion flow path within the die; as the resins issue from the first and second-mentioned flow paths and without exposing them to the atmosphere, applying the acrylic resin as a strip-like flat face layer of lesser thickness upon the polycarbonate resin as a strip-like flat base layer of greater thickness within a final extrusion flow path within the die, pressure-energizing and advancing the two molten resin streams in wide face abutment with respect to each other within and along the final extrusion flow path to outwardly exit from the die as an extruded layered flow stream, and substantially immediately adjacent the exit of the layered stream from the die subjecting it to cooling and solidification and forming a molecularly bonded-together composite strip-like member; in furtherance of the process, advancing the polycarbonate resin material as a centrally disposed streamlike base layer; advancing the acrylic resin material in the form of two streamlike layers of strip-like section, each of lesser thickness than the polycarbonate strip-like section within the die and applying them in an aligned abutting relation to opposite faces of the base layer; and forming a composite resin member length having a base layer of the polycarbonate resin material and opposed facing layers of the acrylic resin material.

2. In a process as defined in claim 1, employing a pair of positively forwardly driven pinch rolls for advancing the composite member outwardly from the exit, and effecting the cooling and solidification-forming of the composite strip-like member before subjecting the member to the pinch rolls.

3. In a process as defined in claim 1, forming the polycarbonate as a base layer having a thickness of about 0.240 of an inch, and forming the acrylic layer as a surface facing layer having a thickness of about 0.005 of an inch.

4. In a process as defined in claim 3, advancing the polycarbonate base layer a molten temperature of about 450° to 500° F. and the acrylic layer at a temperature of about 400° F. into and in wide face abutment with respect to each other within and along the die.

5. In a process as defined in claim 1, applying each acrylic face layer of a thickness of about 0.005 of an inch and at a temperature of about 400° F to the polycarbonate base layer of a thickness of about 0.240 of an inch and at a temperature of about 450° to 500° F.

* * * * *